Figure 1:
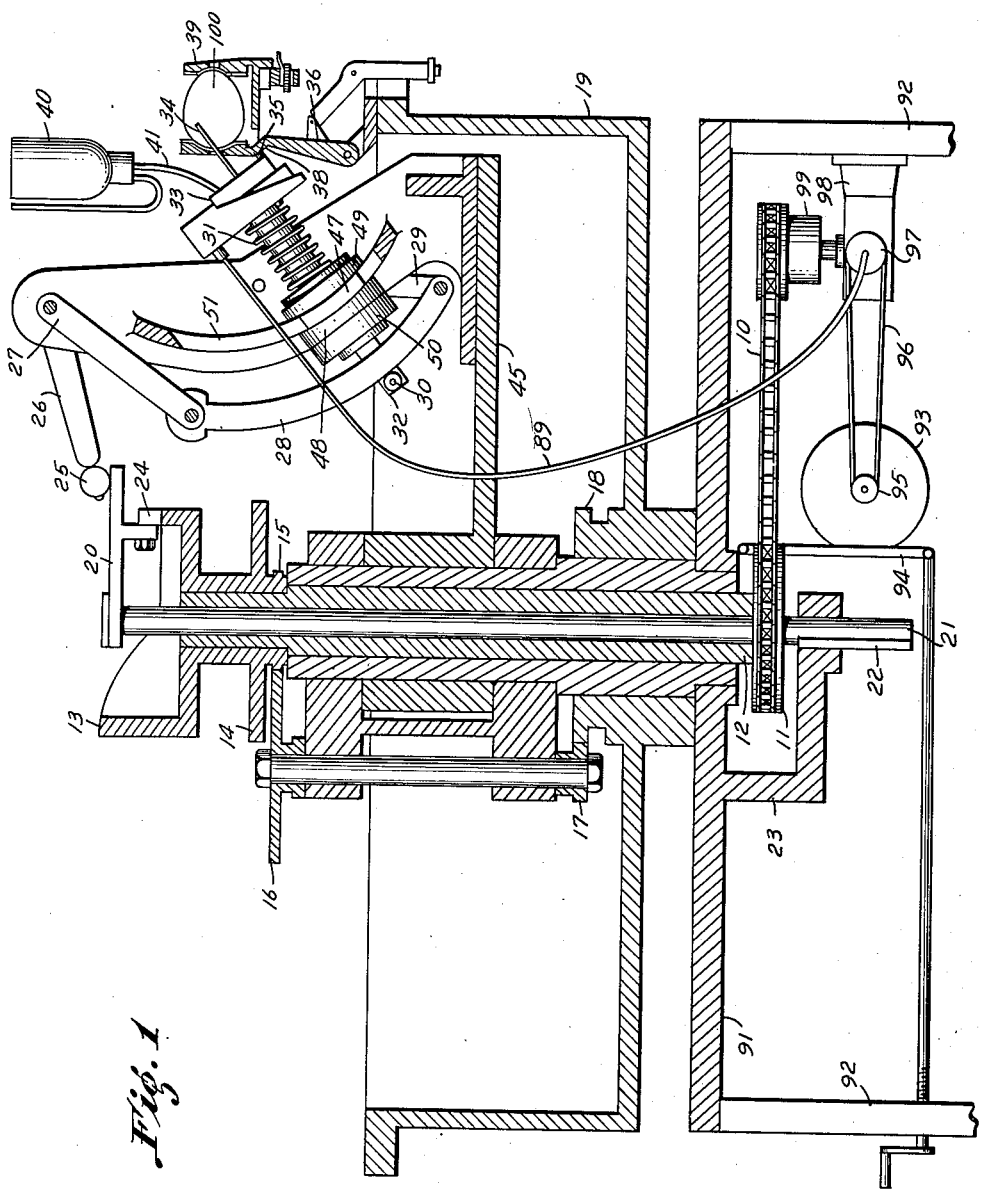

Sept. 11, 1956   J. C. WAGNER ET AL   2,762,365
AUTOMATIC INOCULATING APPARATUS
Filed Dec. 16, 1948   6 Sheets-Sheet 1

Inventors
JOHN C. WAGNER
DAVID T. JAMES

BY  Carlton C. Davis
    Attorney

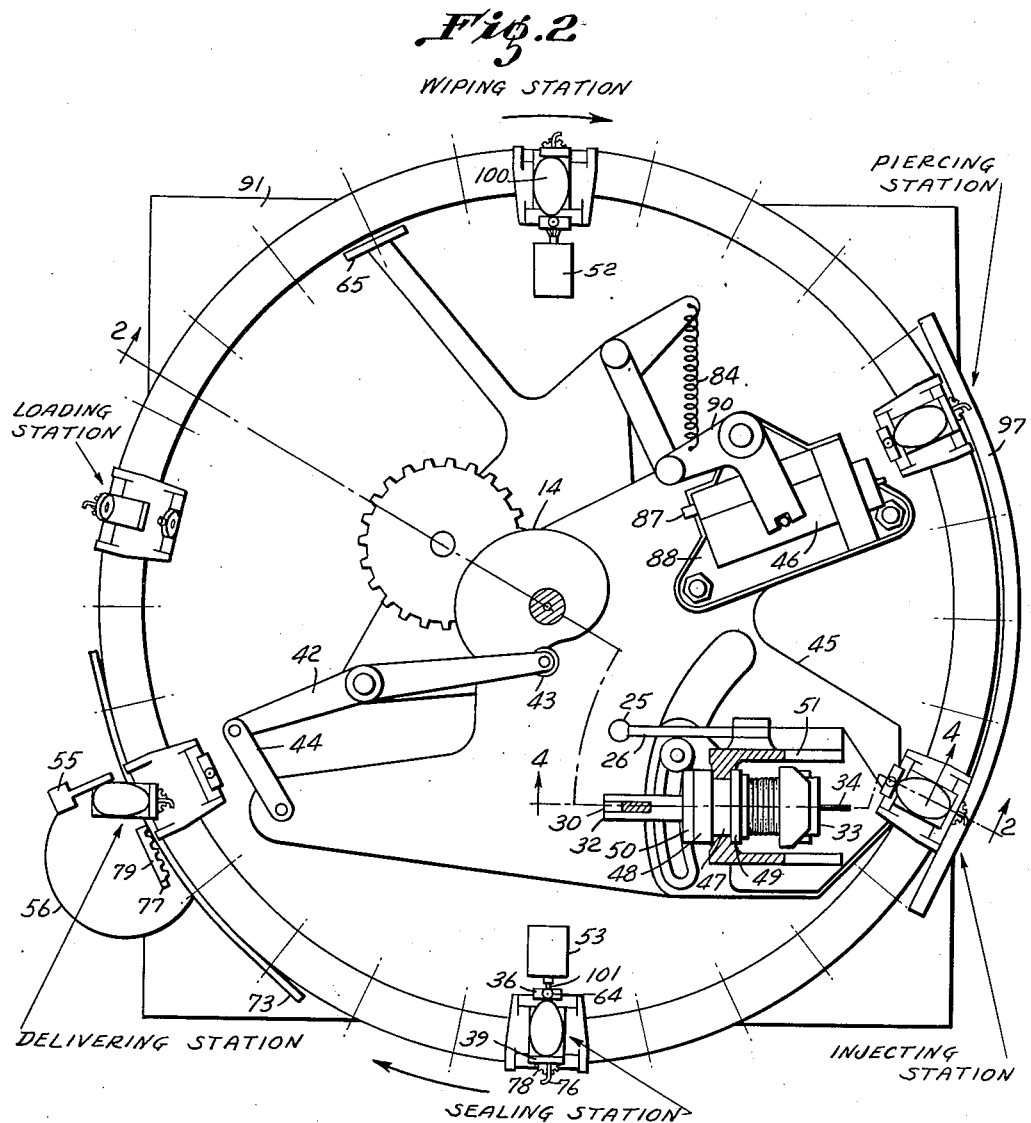

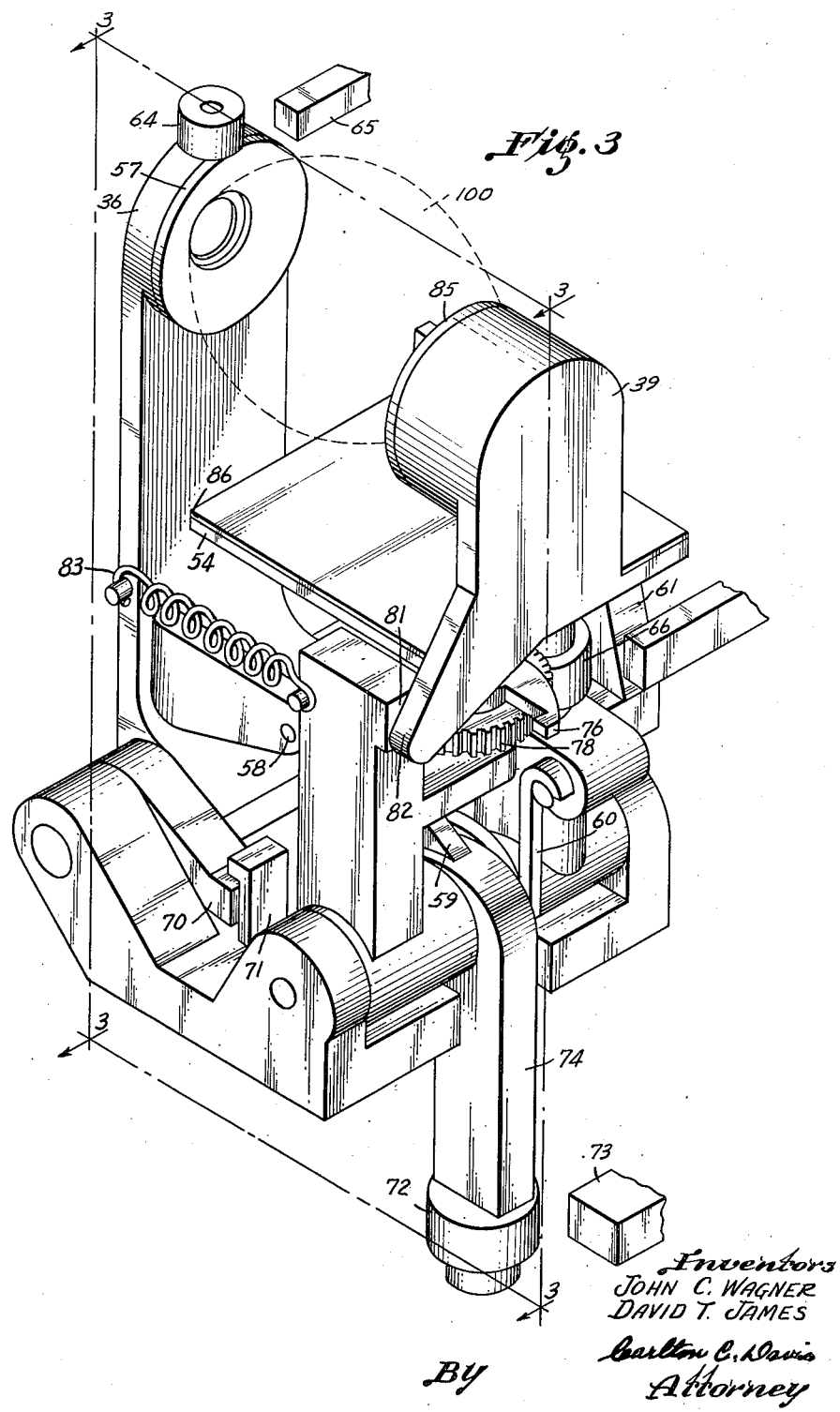

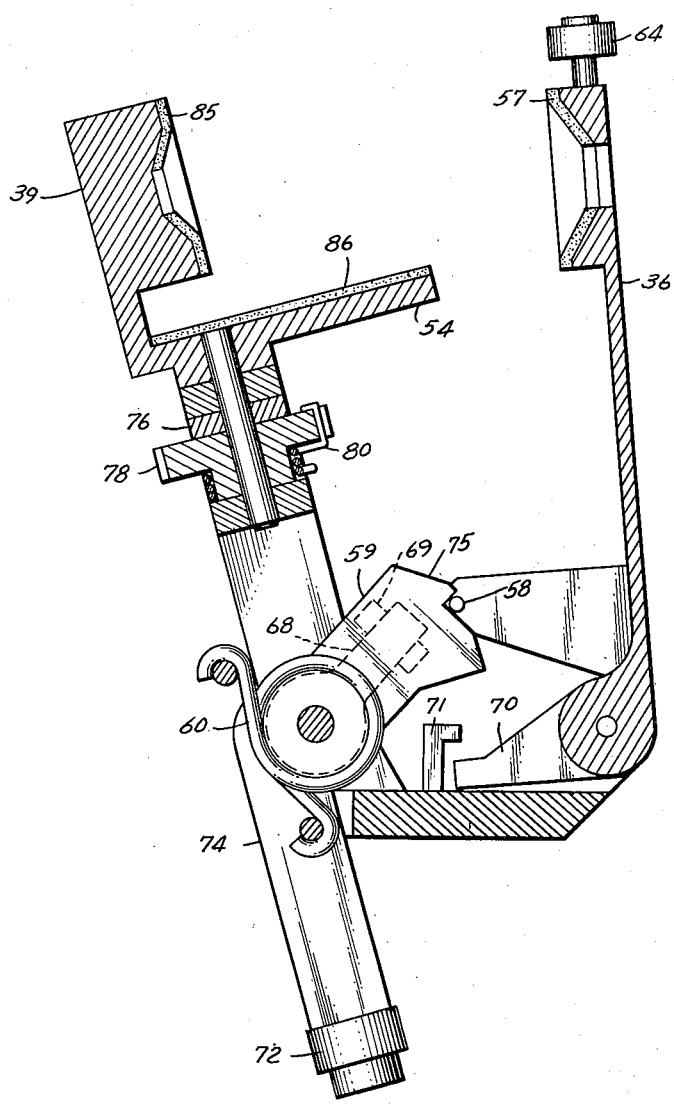

Sept. 11, 1956         J. C. WAGNER ET AL         2,762,365
                   AUTOMATIC INOCULATING APPARATUS
Filed Dec. 16, 1948                          6 Sheets-Sheet 5
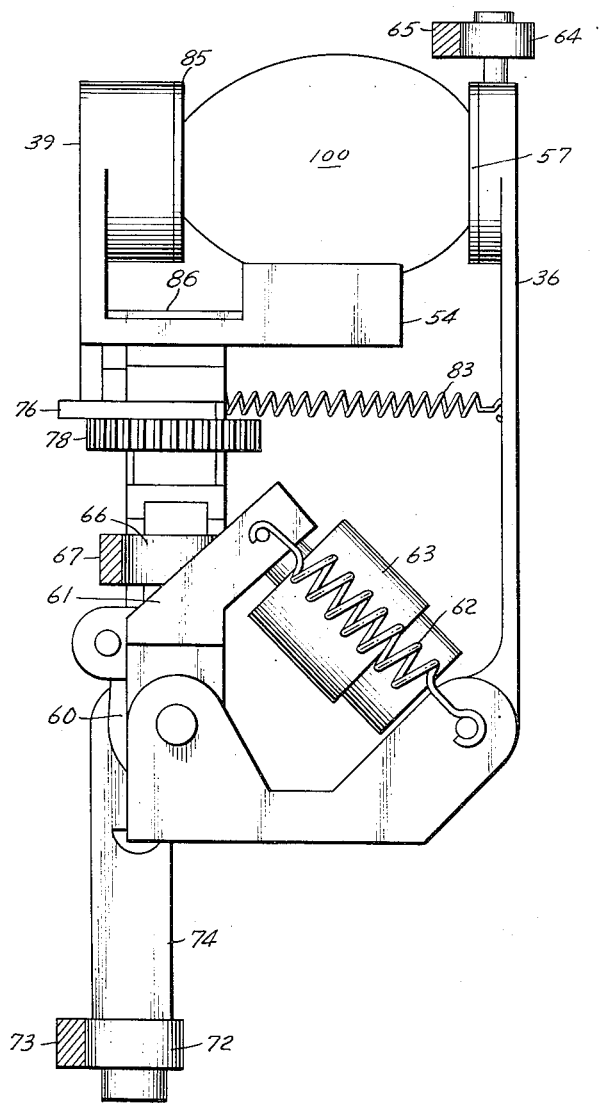
Inventors
JOHN C. WAGNER
DAVID T. JAMES
BY Carlton C. Davis
   Attorney

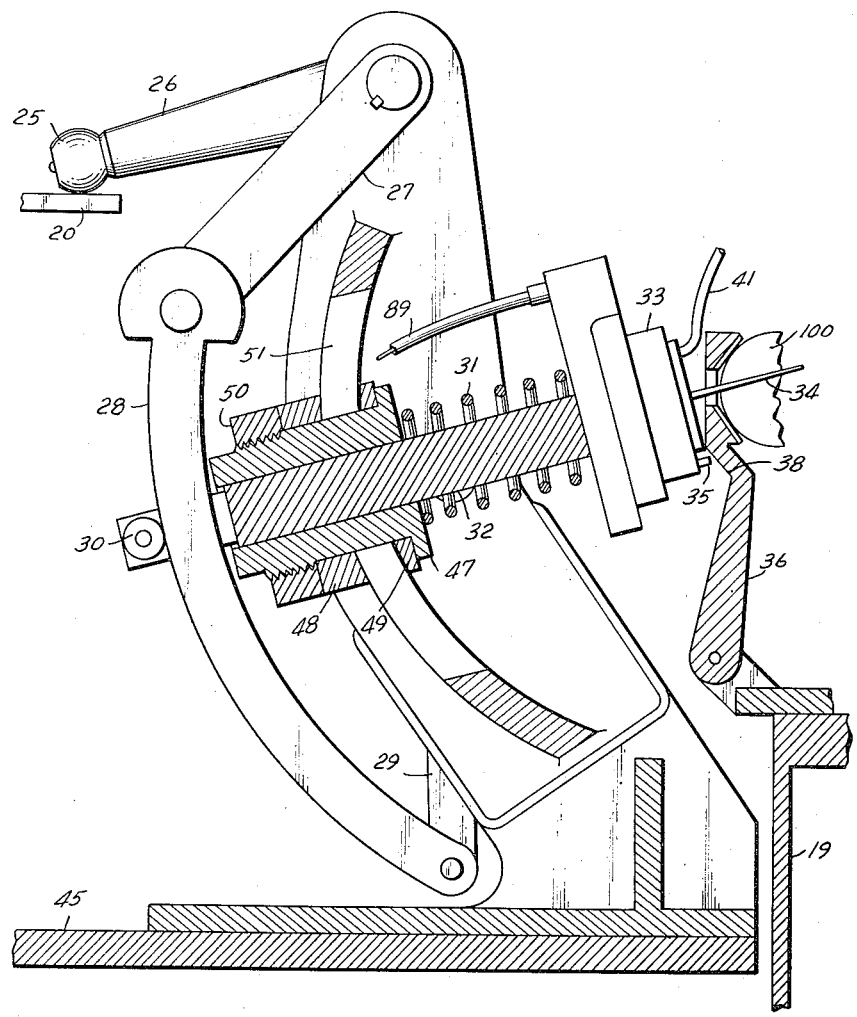

United States Patent Office 2,762,365
Patented Sept. 11, 1956

2,762,365

AUTOMATIC INOCULATING APPARATUS

John C. Wagner, Frederick, and David T. James, Middletown, Md.

Application December 16, 1948, Serial No. 65,542

2 Claims. (Cl. 128—1)

(Granted under Title 35, U. S. Code (1952), sec. 266)

The invention described herein may be manufactured and used by or for the Government, for governmental purposes, without the payment to us of any royalty thereon.

Our invention relates to novel apparatus for the production of biologicals. It achieves mass production of vaccines derived from the growth of viruses, Rickettsiae, and other living forms, by automatic inoculation of fertilized hen's eggs or like objects.

The invention broadly contemplates: a plurality of gripping mechanisms supported on a revolving turret; adapted first to receive the eggs from the hand of an operator, subsequently to transport them to various operating stations, and finally to discharge them to the hand of an operator or to a suitable receptacle. These operating stations include: an initial operating station provided with applicator means which applies antiseptic around the area of the egg shell to be perforated; next, a punch station to make an entry perforation in the shell of the egg; next, an injecting station arranged to insert a fine tube or hollow needle through the entry perforation and into the egg so that it will reach a definite location within the egg and inject into the egg a definite amount of liquid, after which the tube or needle is retracted; and finally, a sealing station to seal the entry hole and to deliver the egg.

Prior processes have not taught automatic machine inoculation of fertilized eggs. In the past inoculation of fertilized hen's eggs or the like with living forms has been accomplished almost entirely by hand-inoculating one egg at a time. Also each other requisite step in the process has been accomplished manually, handling one egg at a time.

A preliminary step in the production of vaccines is to cultivate the micro-organism. There are no known means of cultivating viruses and certain other living forms away from living tissue. The best known prior method is to grow viruses in fertilized or embryonated hen's eggs. This is done by injecting a virus solution into a fertilized egg, whose surface has been cleaned and sterilized and an aperture made at the desired location in the shell to receive the inoculum. The aperture is then sealed and the inoculated embryonated egg is placed in an incubator for a prescribed period, depending upon the nature of the inoculum and the type of product desired.

The virus, after being inoculated into the embryonated egg, grows and multiplies concurrently with the development of the embryo. The effect may be to kill the embryo, but from experience it is known when to harvest the growing virus—that is, to open the egg, remove the virus-infected tissue, and further process it to produce the desired end product, which may be more virus, a vaccine, or other product.

The prior process of producing vaccines in quantity, using embryonated eggs, can roughly be divided into six stages as follows:

Stage 1: fertilized eggs are carefully chosen and their surfaces cleaned and rendered aseptic by dipping into a prepared solution or coating with an antiseptic material to remove or kill organisms or foreign matter contaminating the surface.

Stage 2: a window or aperture is made at the proper place or a hole is drilled through which the inoculum may be injected.

Stage 3: the egg is then inoculated by hand, using a hypodermic needle or other suitable device. It is important that the inoculum be introduced at the right place and depth and that an exact quantity be injected.

Stage 4: the window or hole is sealed.

Stage 5: the egg is placed in an incubator. As stated, the prescribed incubation period depends upon the nature of the inoculum and the type of product desired.

Stage 6: the material is harvested and further processed to prepare the desired end product.

Our invention is primarily concerned with the first four stages. By prior procedures they are accomplished manually. The cutting of the window and the inoculation are done by hand under proper conditions to prevent contamination or infestation of the egg by extraneous organisms. Despite these precautions, extraneous organisms may inadvertently be introduced and contaminate the egg. Because prior processes are manual they are subject to the human errors of all manual techniques. Also, production is limited, since the manual process depends upon the number of skilled technicians available and requires methodical and accurate techniques and procedures. Lastly, the prior processes are relatively costly, commercial production volumes are thereby limited, and manual techniques are not conducive to large scale research procedures. Obviously, therefore, automatic machine inoculation is a notable step in the advancement of the art.

A primary object of our present invention is to inoculate a greater quantity of eggs in a given time with proportionately fewer technicians. This is accompanied by lower unit costs and hence a cheaper price to the ultimate consumer. The result is a striking achievement in the desirable direction of making economically possible wider mass inoculation against virus diseases, stepping up research, and releasing scarce, highly trained technicians for other research.

Another object is to minimize errors in manual techniques by increasing the accuracy of the dosage of inoculum.

A further object is to assure more favorable conditions for the maintenance of asepsis.

Other equally important objects will appear more plainly from the detailed specification and drawings herein presented in exemplification but not in limitation of the present invention. Like reference characters represent like parts of a preferred embodiment of the present invention, shown in the accompanying drawings which illustrate diagrammatically in:

Fig. 1: a vertical cross section of the machine taken on line 2, 2 of Fig. 2, and showing the needle inserted in the egg at the injecting station.

Fig. 2: a plan view of the machine, showing the needle out of the egg at the injecting station with the top cam omitted. Several gripping mechanisms are also omitted from between the six stations for clarity.

Fig. 3: an isometric view of the gripping mechanism in position as with egg in place.

Fig. 4: a sectional view of the gripping mechanism, taken on plane 3, 3, 3, 3, of Fig. 3, and shown in the latched position ready to receive the egg.

Fig. 5: an elevation, partly in cross section, of the vertical gripping mechanism showing the egg in place.

Fig. 6: a sectional view of the injecting mechanism set at 15° from horizontal, taken on line 4, 4 of Fig. 2.

When the directions "inward" and "outward" are used they refer to a direction in toward the center of the machine as a whole, and a direction out from the center of the machine as a whole, respectively.

As shown in Fig. 1, the table 91 and its legs or standards 92 may constitute the framework of the machine. On the underside of the table is mounted a motor 93 on mount 94. A variable pitch pulley 95 on the motor, a V-belt 96, and a speed reducer pulley 97, form the drive from the motor to a speed reducer 98. On the output shaft of the reducer is a drive sprocket 99, which with a chain 10 and driven sprocket 11 forms the drive from the speed reducer to a vertical hollow shaft 12. The drive to this point may be as described or may be effected by some other suitable means. At the top of shaft 12 are an upper cam 13, a lower cam 14, and a pinion 15, the latter of which, through a train comprising gear 16, pinion 17, and gear 18, drives the turret 19 at a constant rate, said rate being timed to present eggs 100 in the gripping mechanisms, hereinafter described, at proper intervals to the operating stations.

Referring to Fig. 4: the gripping mechanism comprises an inner finger 36, and an outer finger 39 each preferably fitted with linings 57 and 85, respectively, of material suitable to the character of the object being gripped. Wool felt is one suitable material for our purpose.

Referring to Figs. 2, 4, and 5: when the egg 100 is put against the lining 57 of inner finger 36 and pushed inward, stop pin 58 moves free of the latching surface of lever 59, which is then free to be pulled forward through torsion spring 60 and lever 61, which is pulled inward by spring 62 gripping the egg between surfaces 57 and 85. The dashpot 63 opposes the action of spring 62, thus reducing the impact against the egg 100. Should the operator fail to insert an egg, roll 64 rides against cam 65, moving inner finger 36 inward and through it releasing lever 59 to prevent overload of spring 60 when the added load next to be described is applied. At the punching station roller 66 follows cam 67 and, through spring 60 and lever 59 which bears against lever 68 at point 69, applies an added load to hold the egg 100 more firmly in place against finger 36, which is limited in its motion by its projection 70 against stop 71. This added pressure is also applied at the injecting station.

Referring to Figs. 2, 3, and 4: at the discharge location roll 72 follows cam 73, tipping lever 74 outward, and pin 58 slides on surface 75 to drop under the projection on lever 59, being drawn outward by spring 83 (see Fig. 3). The egg 100 drops on pan 54, which pan may be covered with a suitable material 86 to cushion the fall of the egg 100 and to form a pocket to receive it. In our case wool felt is one suitable material. With the levers in this position the egg may be removed by hand. As the gripping mechanism progresses beyond the point for removal of the egg by the operator, with roll 72 still in contact with cam 73, single tooth 76 comes in contact with pin 77 (see Fig. 2) and time gear 78 for proper engagement with gear segment 79 (see Fig. 2). Gear 78 is driven by gear segment 79 and rotates about its center carrying pan 54 approximately 180° before coming to the end of gear segment 79, so that if the egg 100 remains on pan 54, pin 55 comes in contact with it, restraining the egg from further travel whereupon the pan moves out from under the egg which drops into receptacle 56 (see Fig. 2). When gear 78 reaches the end of gear segment 79, torsion spring 80 (see Fig. 4), returns pan 54 to its original position with arm 82 against surface 81 (see Fig. 3). At the end of cam 73 roll 72 is released and lever 59 settles down against pin 58, being drawn into place by spring 62, through lever 61, through spring 60 (see Fig. 5), and the gripping mechanism is ready to receive another egg. After the egg 100 has been placed in the gripping mechanism it is carried past antiseptic station 52 (see Fig. 2) which wipes antiseptic onto the surface of the egg to disinfect the location to be perforated.

Referring to Fig. 2: the punch 46 is operated at each oscillation of plate 45 when it is brought into synchronism with turret 19 (see Fig. 1) and punches a hole in the end of the egg. There is a limit switch 87 on the punch frame 88, this switch being interlocked in the drive circuit so that if the punch fails to retract from the egg and thereby to operate the switch before plate 45 goes out of synchronism with turret 19 the machine automatically stops until the punch has been retracted, thereby preventing damage to punch or gripping mechanism. The injecting mechanism is so adjusted that tube 34 enters the hole made in the egg at the punch station.

Referring to Fig. 1: plate 20 on rod 21, restrained from rotation by key 22 in bracket 23 or some other suitable device, has vertical motion imparted to it from cam 13 through follower roller 24. Roller 25 on lever 26 has motion imparted to it by plate 20 and imparts motion to the remainder of the linkage consisting of lever 27, curved link 28, and lever 29. Roller 30 is held against curved link 28 by spring 31, through plunger 32, thereby following the motion of curved link 28 so as to impart a reciprocating motion to plunger 32, which carries on its outer end a pump 33, a tube 34, and a tripping button 35. In the event that an egg is contained in the gripping mechanism, finger 36 of the gripping mechanism is held in its inward position by pressure from lever 39, transmitted through the egg. When such is the case, tripping button 35 touches contact surface 38 on finger 36 and trips a release mechanism on pump 33, allowing it to draw fluid from supply bottle 40, through tube 41, and to eject it through tube 34 into the egg. Power is supplied to pump 33 through flexible shaft 89, from reducer 98. In following the motion of cam 13 this entire linkage reverses its motion, withdrawing plunger 32, consequently removing tube 34 from the egg and allowing tripping button 35 to reset itself for a subsequent repetition of the operation.

Referring to Fig. 2: cam 14 imparts a rocking motion to lever 42, through follower roll 43 and through link 44, oscillating plate 45 bearing the injector mechanism and punch 46 to provide an interval during each oscillation when the punch 46 and injector mechanism respectively are in register with an egg and move with it, and during which time they perform their respective functions of punching and injecting. Spring 84, attached to bracket 90, operating through this linkage holds follower roll 43 against cam 14.

Referring to Fig. 1: the injecting station plunger 32 passes through a sleeve 47, which is mounted on two adapting washers 48 and 49, and a locking nut 50 on a curved slide and bracket 51, which is mounted on oscillating plate 45 and is adjustable in a horizontal plane around a vertical axis which, when the oscillating plate is in time with the motion of the egg, passes through the point of entry of tube 34 into the egg. Slide and bracket 51 also mounts the linkage consisting of lever 29, line 28, lever 27, lever 26 and roll 25. Horizontal adjustment is permissible, since plate 20 is made of such extent as to contact roll 25 at any point within its range of adjustment.

Tube 34 is adjustable longitudinally in the pump and may, to begin with, be made of suitable length.

The sealant station 53, using a suitable sealant material, forms a seal over the hole in the shell of the egg. It may comprise a swab, or brush, 101 which may be fed from a well 53 for the sealant material.

If the operator fails to remove the egg at the completion of all operations, it is brushed off the gripping mechanism pan 54 by rod 55 and drops into container 56.

Our invention has many significant and apparent advantages.

First and foremost are the commercial advantages of economy that follows automatic mass production techniques. This invention will result in a greater volume of commercial production of vaccines at lower unit costs. This increased production, and low unit cost, will aid in the war against disease by facilitating the immunization of greater numbers of the population. The invention also places a valuable tool in the hands of the scientific research worker. It represents a decided advantage over manual techniques, by the elimination of many human errors. The maintenance of aseptic conditions throughout the process is facilitated. It releases scarce skilled technicians for other important and valuable research studies and production processes. Many other advantages will become apparent as the invention enjoys wider commercial and technical use.

To prevent damage to the apparatus as a result of overload, the motor drive in Figure 1 is provided with an overload device shown at 99. This is preferred to be of the improved type illustrated and described in the co-pending patent application No. 68,706 of co-applicant David T. James entitled "Overload Release Mechanism," filed December 31, 1948, and now Patent No. 2,537,672.

Control of the amount of the inoculant delivered at 34 in Figure 1 is preferably assured by means of the novel one revolution control mechanism described in the co-pending patent application Serial No. 68,707 filed by co-applicant David T. James entitled "Revolution Control Mechanism," filed December 31, 1948, and now Patent No. 2,537,673.

In certain operations requiring the use of toxic or pathogenic inoculants it is of obvious importance to positively prevent all leakage and to obtain accurate metered delivery of the inoculant. For this purpose it is preferred to use at 33, the improved pump described in the co-pending joint application Serial No. 68,708 of co-applicant David T. James and of Arthur J. Rawson entitled "Displacement Pump," filed December 31, 1948, and now Patent No. 2,551,605, preferably in conjunction with the above-described "Revolution Control Mechanism."

Of course the mechanism may be modified in many ways within the contemplation of the present invention. For example, the invention is capable of embodiment in other than rotary fashion. The operations may be made to take place in straight line assembly-flow fashion, or in other variations.

The design for the gripping mechanism may be varied, to conform to special operations. Other materials may be substituted. The dimensions may be changed. These and many other modifications and changes may be made without departing from the true spirit and scope of the appended claims.

We claim:

1. In combination, in automatic apparatus for performing a sequence of operations upon a series of articles wherein each of said articles contains a mass of matter: a station for receiving said articles; a station for delivering said articles; a series of intervening operating stations; a series of gripping mechanisms arranged to carry said articles during said sequence; means for advancing said gripping mechanisms up to and away from each of said stations; one of said operating stations comprising means for injecting a charge of material into each of said articles.

2. In combination, in automatic apparatus for performing a sequence of operations upon a series of articles of the type described: a station for receiving said articles; a station for delivering said articles; a series of intervening operating stations; a series of gripping mechanisms arranged to carry said articles during said sequence; means for advancing said gripping mechanisms up to and away from each of said stations; one of said operating stations comprising means for injecting an inoculant or the like into each of said articles; and means for depositing said inoculant within said article.

References Cited in the file of this patent

UNITED STATES PATENTS

| | | |
|---|---|---|
| 2,377,796 | McKinnis | June 5, 1945 |
| 2,389,268 | McKinnis | Nov. 20, 1945 |
| 2,399,914 | Doering | May 7, 1946 |
| 2,415,236 | Bunney et al. | Feb. 24, 1947 |
| 2,433,061 | Pearson et al. | Dec. 23, 1947 |